US012549877B2

(12) United States Patent
Chen et al.

(10) Patent No.: US 12,549,877 B2
(45) Date of Patent: Feb. 10, 2026

(54) AUDIO EQUIPMENT

(71) Applicant: Tymphany HK Limited, Hong Kong (HK)

(72) Inventors: Yang Chen, Taipei (TW); Kai-Li Wang, Taipei (TW); Yi-Ming Wu, Taipei (TW)

(73) Assignee: TYMPHANY HK LIMITED, Hong Kong (HK)

( * ) Notice: Subject to any disclaimer, the term of this patent is extended or adjusted under 35 U.S.C. 154(b) by 181 days.

(21) Appl. No.: 18/536,660

(22) Filed: Dec. 12, 2023

(65) Prior Publication Data

US 2024/0205574 A1 Jun. 20, 2024

Related U.S. Application Data

(60) Provisional application No. 63/433,332, filed on Dec. 16, 2022.

(51) Int. Cl.
*H04R 1/02* (2006.01)

(52) U.S. Cl.
CPC .................................... *H04R 1/02* (2013.01)

(58) Field of Classification Search
CPC ............................... H04R 1/02; H04R 1/2826
USPC .................................. 381/87, 332, 334–336
See application file for complete search history.

(56) References Cited

U.S. PATENT DOCUMENTS

2014/0219490 A1* 8/2014 Quinn ..................... H04R 1/32 381/349

* cited by examiner

*Primary Examiner* — George C Monikang
(74) *Attorney, Agent, or Firm* — MUNCY, GEISSLER, OLDS & LOWE, P.C.

(57) ABSTRACT

An audio equipment includes a first air pipe and a second air pipe. The first air pipe includes a first audio inlet, a first audio outlet and a first wall. The first wall extends from the first audio inlet to the first audio outlet. The second air pipe shares the first wall with the first air pipe. The second air pipe includes a second audio inlet and a second audio outlet. The first wall extends from the second audio inlet to the second audio outlet, and the facing direction of the first audio outlet is different from the facing direction of the second audio outlet.

19 Claims, 4 Drawing Sheets

AUDIO EQUIPMENT

CROSS-REFERENCE TO RELATED APPLICATIONS

This application claims priority of U.S. Provisional Application No. 63 433,332 filed on Dec. 16, 2022 under 35 U.S.C. § 119(e), the entire contents of which are hereby incorporated by reference.

FIELD OF THE INVENTION

The present disclosure relates to a technical field of audio devices, and particularly relates to an audio equipment.

BACKGROUND OF THE INVENTION

Air pipes (also known as inverted tubes) are configured to guide audio signals of backs of loudspeaker units of an audio equipment to the outside of the audio equipment to intensify the audio signals of the audio equipment and improving the audio quality of the audio equipment. One terminal of each of the air pipes is connected to the back of the corresponding loudspeaker unit, and the other terminal of each of the air pipes is connected to the outside of the audio equipment. The number of the air pipes are configured according to the number of the loudspeaker units, and one loudspeaker unit is correspondingly disposed with one air pipe. For example, when there are two loudspeaker units in the audio equipment, two independent air pipes are required. Each of the two air pipes independently corresponds to one loudspeaker unit, and each of the two air pipes occupies more space so that the space inside the audio equipment is crowded. Hence, the conventional configuration of the air pipes has the problem of occupying excessive space inside the audio equipment.

SUMMARY OF THE INVENTION

The object of the present disclosure is to provide an audio equipment in which air pipes occupy less space, and the audio equipment includes a first air pipe and a second air pipe. The first air pipe includes a first audio inlet, a first audio outlet and a first wall. The first wall extends from the first audio inlet to the first audio outlet. The second air pipe shares the first wall with the first air pipe. The second air pipe includes a second audio inlet and a second audio outlet. The first wall extends from the second audio inlet to the second audio outlet, and the facing direction of the first audio outlet is different from the facing direction of the second audio outlet.

In some embodiments of the present disclosure, the first audio inlet is close to the second audio outlet and is far away from the second audio inlet, and the first audio outlet is close to the second audio inlet and is far away from the second audio outlet.

In some embodiments of the present disclosure, the facing direction of the first audio inlet is different from the facing direction of the first audio outlet.

In some embodiments of the present disclosure, the facing direction of the second audio inlet is different from the facing direction of the second audio outlet.

In some embodiments of the present disclosure, the first audio inlet includes a first audio input boundary, and the first audio outlet includes a first audio output boundary.

In some embodiments of the present disclosure, the first wall includes a first arc surface, a second arc surface and a first plane. The first arc surface extends from the first audio input boundary to the first plane, and the second arc surface extends from the first plane to the first audio output boundary.

In some embodiments of the present disclosure, the first air pipe further includes a second wall. The second wall extends from the first audio inlet to the first audio outlet and faces the first wall.

In some embodiments of the present disclosure, the audio equipment further includes a first accommodation cavity, and the second wall is disposed around the first accommodation cavity.

In some embodiments of the present disclosure, the second wall includes a third arc surface, a fourth arc surface and a second plane. The third arc surface extends from the first audio input boundary to the second plane, and the fourth arc surface extends from the second plane to the first audio output boundary.

In some embodiments of the present disclosure, the first wall includes a first plane, and the second plane is disposed in parallel with the first plane.

In some embodiments of the present disclosure, the second audio inlet includes a second audio input boundary, and the second audio outlet includes a second audio output boundary.

In some embodiments of the present disclosure, the first wall includes a fifth arc surface, a sixth arc surface and a third plane. The fifth arc surface extends from the second audio input boundary to the third plane, and the sixth arc surface extends from the third plane to the second audio output boundary.

In some embodiments of the present disclosure, the second air pipe further includes a third wall. The third wall extends from the second audio inlet to the second audio outlet and faces the first wall.

In some embodiments of the present disclosure, the audio equipment further includes a second accommodation cavity, and the third wall is disposed around the second accommodation cavity.

In some embodiments of the present disclosure, the third wall includes a seventh arc surface, an eighth arc surface and a fourth plane. The seventh arc surface extends from the second audio input boundary to the fourth plane, and the eighth arc surface extends from the fourth plane to the second audio output boundary.

In some embodiments of the present disclosure, the first wall includes a third plane, and the fourth plane is disposed in parallel with the third plane.

In some embodiments of the present disclosure, the audio equipment further includes a front case, a back case, a second wall and a third wall. The front case, the first wall, the second wall and the back case form the first air pipe, and the front case, the first wall, the third wall and the back case form the second air pipe.

In some embodiments of the present disclosure, the audio equipment further includes a first cavity, a second cavity, a first loudspeaker unit and a second loudspeaker unit. The first loudspeaker unit is disposed on the first cavity, and the first air pipe is connected to the first cavity and the outside of the audio equipment. The second loudspeaker unit is disposed on the second cavity, and the second air pipe is connected to the second cavity and the outside of the audio equipment.

In some embodiments of the present disclosure, the facing direction of the diaphragm of the first loudspeaker unit is vertical to the facing direction of the first audio inlet, and the facing direction of the diaphragm of the second loudspeaker unit is vertical to the facing direction of the second audio inlet.

In some embodiments of the present disclosure, the width of the first audio inlet is greater than the width of the first audio outlet, and the width of the second audio inlet is greater than the width of the second audio outlet.

The first air pipe includes the first audio inlet, the first audio outlet and the first wall. The first wall extends from the first audio inlet to the first audio outlet. The second air pipe shares the first wall with the first air pipe. The second air pipe includes the second audio inlet and the second audio outlet. The first wall extends from the second audio inlet to the second audio outlet, and the facing direction of the first audio outlet is different from the facing direction of the second audio outlet. Because the first air pipe and the second air pipe share the first wall, the space occupied by the first wall on the first air pipe or the second air pipe is at least saved and thus the space inside the audio equipment occupied by the first air pipe or the second air pipe is reduced.

The aforementioned description of the present disclosure is merely the outline of the technical solutions of the present disclosure. In order to understand the technical solutions of the present disclosure clearly and to implement the present disclosure according to the content of the specification, the better embodiments of the present disclosure given herein below with accompanying drawings are used to describe the present disclosure in detail.

THE DRAWINGS

DETAILED DESCRIPTION

The specific embodiments of the present disclosure given herein below are used to explain the implementation of the present disclosure. A person having ordinary skill in the art would easily understand the advantages and the effects of the present disclosure from the content of the present disclosure.

It should be noted that the embodiments and the features in the embodiments of the present disclosure can be combined with each other without conflict. The present disclosure will be described in detail below with reference to accompanying drawings and in conjunction with the embodiments. In order to provide those in the art with better understanding of the solution of the disclosure, the technical solutions in the embodiments of the present disclosure will be described clearly and completely below in conjunction with the accompanying drawings in the embodiments of the present disclosure. Apparently, the described embodiments are merely a part of the embodiments of the present disclosure and not all embodiments of the present disclosure. Based on the embodiments of the present disclosure, all other embodiments obtained by a person skilled in the art shall fall within the scope of protection of the present disclosure.

It should be noted that the terms “first”, “second”, etc. in the specification and claims of the present disclosure and in the aforementioned accompanying drawings are used to distinguish similar objects and need not be used to describe a particular order or sequence. Furthermore, the terms “comprising” and “having”, and any variation thereof, are intended to encompass a non-exclusive inclusion, for example, a series of steps or units comprising processes, methods, systems, products or equipment need not be limited to those steps or units clearly listed but may include other steps or units not clearly listed or inherent to those processes, methods, products or equipment.

It should be noted that the terms “mount”, “connect”, “link” should be broadly interpreted, for example, may be a permanent connection, may be a dismountable connection or may be an integral connection; may be a mechanical connection or may be an electrically connection; may be a direct connection, may be a connection by intermediate mediums, or may be an interior connection between two components. For a person skilled in the art, the meaning of the aforementioned terms in the present disclosure may be understood upon specific situations.

Figure 1:
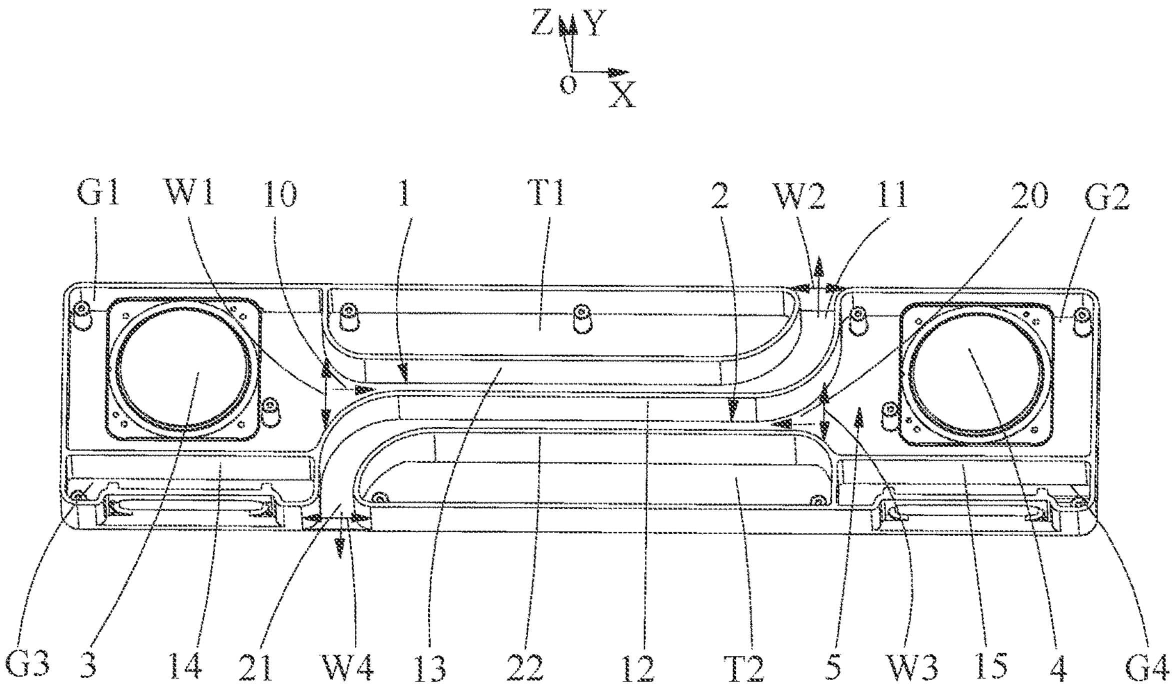
FIG. 1 is a 3D diagram of an audio equipment according to one embodiment of the present disclosure (omitting a front case).

As shown in FIG. 1, one embodiment of the present disclosure provides an audio equipment, and the audio equipment includes a first air pipe 1 and a second air pipe 2. The first air pipe 1 includes a first audio inlet 10, a first audio outlet 11 and a first wall 12. The first wall 12 extends from the first audio inlet 10 to the first audio outlet 11. The second air pipe 2 is adjacent to the first air pipe 1 and shares the first wall 12 with the first air pipe 1. The second air pipe 2 includes a second audio inlet 20 and a second audio outlet 21. The first wall 12 extends from the second audio inlet 20 to the second audio outlet 21. The facing direction of the first audio outlet 11 is different from the facing direction of the second audio outlet 21. The first audio outlet 11 and the second audio outlet 21 are respectively located on the upper right side and the lower left side of the audio equipment, and in other words, the first audio outlet 11 and the second audio outlet 21 are respectively located on two different long side surfaces and have interlaced arrangements on x-axis.

As shown in FIG. 1, for convenience to explain, Cartesian coordinate system O-xyz may be disposed in each figure. X-axis is parallel to the length direction of the audio equipment, and y-axis is parallel to the width direction of the audio equipment. The audio equipment may include a first loudspeaker unit 3 and a second loudspeaker unit 4. The shape of the audio equipment is a long rectangular parallelepiped. The first loudspeaker unit 3 and second loudspeaker unit 4 are configured to transform electrical signals to audio signals. When the diaphragm of the first loudspeaker unit 3 vibrates along a direction parallel to z-axis, the audio signals generated by the diaphragm of the first loudspeaker unit 3 inside the audio equipment may be transmitted to the outside of the audio equipment by the first air pipe 1 (the transmission direction on the first air pipe 1 of the audio signals generated by the first loudspeaker unit 3 may be shown as the arrow of the first air pipe 1 in FIG. 1), and the facing direction of the diaphragm of the first loudspeaker unit 3 is vertical to the facing direction of the first audio inlet 10. For example, the facing direction of the diaphragm of the first loudspeaker unit 3 may be the direction parallel to z-axis and the facing direction of the first audio inlet 10 may be a direction parallel to x-axis. The first audio inlet 10 is an opening which allows the audio signals generated by the first loudspeaker unit 3 to transmit from a first cavity G1 to the first air pipe 1. The first audio outlet 11 is an opening which allows the audio signals in the first air pipe 1 to transmit to the outside of the audio equipment.

As shown in FIG. 1, the first audio inlet 10 may face the lower rear side of the first loudspeaker unit 3. For example, the central axial line of the first audio inlet 10 may be parallel to x-axis and be located on the lower rear side of the first loudspeaker unit 3. The trend of the first air pipe 1 and the trend of the second air pipe 2 may be in shapes of "7", and the shape of the cross section of the first air pipe 1 and the shape of the cross section of the second air pipe 2 may be rectangles. The first air pipe 1 and the second air pipe 2 may be located on the middle position of the width direction and the length direction of the back case 5 of the audio equipment. The first audio inlet 10 may extend along the direction parallel to the negative direction of x-axis and may gradually stretch along a direction parallel to y-axis. The first audio outlet 11 may extend along the direction parallel to the positive direction of y-axis and may gradually stretch along the direction parallel to x-axis. The width W1 of the first audio inlet 10 is greater than the width W2 of the first audio outlet 11, and the part of the first air pipe 1 parallel to x-axis is uniform and consistent with the width of the first air pipe 1. In another embodiment, the width W1 of the first audio inlet 10 may be equal to the width W2 of the first audio outlet 11. The width W1 of the first audio inlet 10 may be the width of the rectangle formed by the intersecting lines of the first audio inlet 10 and a first audio input boundary A1. The width W2 of the first audio outlet 11 may be the width of the rectangle formed by the intersecting lines of the first audio outlet 11 and a first audio output boundary A2.

As shown in FIG. 1, the first wall 12 extends from the first audio inlet 10 to the first audio outlet 11. In one embodiment, the first arc surface 120 of the first wall 12 extends to the first audio input boundary A1 (the first arc surface 120 and the first audio input boundary A1 may refer to FIG. 3, similarly hereinafter), and the second arc surface 122 of the first wall 12 extends to the first audio output boundary A2 (the second arc surface 122 and the first audio output boundary A2 may refer to FIG. 4, similarly hereinafter). In another embodiment, the upper side surface of the first wall 12 extends from an arbitrary position on the lower side surface of the first audio inlet 10 to an arbitrary position on the right side surface of the first audio outlet 11. The first wall 12 is closer and closer to the first audio input boundary A1 and the first audio output boundary A2, and in other words, the first wall 12 is longer and longer, and the effect of saving the space of the first air pipe 1 or the second air pipe 2 is more obvious and more obvious.

As shown in FIG. 1, when the diaphragm of the second loudspeaker unit 4 vibrates along a direction parallel to z-axis, the audio signals generated by the diaphragm of the second loudspeaker unit 4 inside the audio equipment may be transmitted to the outside of the audio equipment by the second air pipe 2 (the transmission direction on the second air pipe 2 of the audio signals generated by the second loudspeaker unit 4 may be shown as the arrow of the second air pipe 2 in FIG. 1), and the facing direction of the diaphragm of the second loudspeaker unit 4 is vertical to the facing direction of the second audio inlet 20. For example, the facing direction of the diaphragm of the second loudspeaker unit 4 may be the direction parallel to z-axis and the facing direction of the second audio inlet 20 may be a direction parallel to x-axis. The second audio inlet 20 is an opening, which allows the audio signals generated by the second loudspeaker unit 4 to transmit to the second air pipe 2. The second audio inlet 20 is an opening which allows the audio signals in the second air pipe 2 to transmit to the outside of the audio equipment. The second audio inlet 20 may face the lower rear side of the second loudspeaker unit 4. For example, the central axial line of the second audio inlet 20 may be parallel to x-axis and be located on the lower rear side of the second loudspeaker unit 4.

As shown in FIG. 1, the trend of the first wall 12 may be in a shape of "S" and the shape of the cross section of the first wall 12 may be a rectangle, and in other words, the shape of the first wall 12 may be a flat ribbon. The first wall 12 may be vertical to the inner wall of the back case 5. The first wall 12 and the back case 5 may be integrally formed. The second audio inlet 20 may extend along the direction parallel to the positive direction of x-axis and may gradually stretch along the direction parallel to y-axis. The second audio outlet 21 may extend along the direction parallel to the negative direction of y-axis and may gradually stretch along the direction parallel to x-axis. The width W3 of the second audio inlet 20 is greater than the width W4 of the second audio outlet 21, and the part of the second air pipe 2 parallel to x-axis is uniform and consistent with the width of the second air pipe 2. In another embodiment, the width W3 of the second audio inlet 20 is equal to the width W4 of the second audio outlet 21. The width W3 of the second audio inlet 20 may be the width of the rectangle formed by the intersecting lines of the second audio inlet 20 and the second audio input boundary B1. The width W4 of the second audio outlet 21 may be the width of the rectangle formed by the intersecting lines of the second audio outlet 21 and the second audio output boundary B2.

As shown in FIG. 1, the first wall 12 extends from the second audio inlet 20 to the second audio outlet 21. In one embodiment, the fifth arc surface 123 of the first wall 12 extends to the second audio input boundary B1 (the fifth arc surface 123 and the second audio input boundary B1 may refer to FIG. 4, similarly hereinafter), and the sixth arc surface 125 of the first wall 12 extends to the second audio output boundary B2 (the sixth arc surface 125 and the second audio output boundary B2 may refer to FIG. 3, similarly hereinafter). In another embodiment, the lower side surface of the first wall 12 extends from an arbitrary position on the upper side surface of the second audio inlet 20 to an arbitrary position on the left side surface of the second audio outlet 21. The first wall 12 is closer and closer to the second audio input boundary B1 and the second audio output boundary B2, and in other words, the first wall 12 is longer and longer, and the effect of saving the space of the first air pipe 1 or the second air pipe 2 is more obvious and more obvious.

Because the first air pipe 1 and the second air pipe 2 share the first wall 12, the space occupied by the first wall 12 on the first air pipe 1 or the second air pipe 2 is at least saved and thus the space inside the audio equipment occupied by the first air pipe 1 or the second air pipe 2 is reduced.

As shown in FIG. 1, optionally, the first audio inlet 10 is close to the second audio outlet 21 and is far away from the second audio inlet 20, and the first audio outlet 11 is close to the second audio inlet 20 and is far away from the second audio outlet 20. By the aforementioned configuration of the first audio inlet 10 and the first audio outlet 11, the audio signals in the first air pipe 1 and the audio signals in the second air pipe 2 after superposition on the transmission direction is more uniform. Specifically, the audio signals generated by the first loudspeaker unit 3 would be gradually low during the transmission from the first audio inlet 10 to the first audio outlet 11. The audio signals generated by the second loudspeaker unit 4 would be gradually low during the transmission from the second audio inlet 20 to the second audio outlet 21.

As shown in FIG. 1, the first audio inlet 10 is close to the second audio outlet 21 and is far away from the second audio inlet 20, and in other words, the end of the first air pipe 1 generating the audio signals with high volume is close to the end of the second air pipe 2 generating the audio signals with low volume. The first audio outlet 11 is close to the second audio inlet 20 and is far away from the second audio outlet 20, and in other words, the end of the first air pipe 1 generating the audio signals with low volume is close to the end of the second air pipe 2 generating the audio signals with high volume. By the aforementioned configuration of the first audio inlet 10 and the first audio outlet 11, the audio signals in the first air pipe 1 and the audio signals in the second air pipe 2 after superposition on the transmission direction may be more uniform. If the end of the first air pipe 1 generating the audio signals with high volume and the end of the second air pipe 2 generating the audio signals with high volume are on the same side, and the end of the first air pipe 1 generating the audio signals with low volume and the end of the second air pipe 2 generating the audio signals with low volume are on the same side, the end of the first air pipe 1 and the end of the second air pipe 2 generating the audio signals with high volume have the audio signals with high volume and the end of the first air pipe 1 and the end of the second air pipe 2 have the audio signals with low volume after the audio signals in the first air pipe 1 and the audio signals in the second air pipe 2 are superimposed on the transmission direction.

As shown in FIG. 1, optionally, the facing direction of the first audio inlet 10 is different from the facing direction of the first audio outlet 11. For example, the facing direction of the first audio inlet 10 may be vertical to the facing direction of the first audio outlet 11. The facing direction of the first audio inlet 10 may be shown as the arrow being coaxial with the central axial line of the first audio inlet 10, and the facing direction of the first audio inlet 10 may be the left direction parallel to x-axis. In other words, the opposite direction of the arrow being coaxial with the central axial line of the first audio inlet 10 in FIG. 1 is the face direction of the first audio inlet 10. The face direction of the first audio inlet 10 is opposite to the direction along which the audio signals of the first loudspeaker unit 3 are transmitted to the first air pipe 1. The facing direction of the first audio outlet 11 may be shown as the arrow being coaxial with the central axial line of the first audio outlet 11, and the facing direction of the first audio outlet 11 may be the upper direction parallel to y-axis. The facing direction of the first audio outlet 11 is the same as the direction along which the audio signals of the first air pipe 1 are transmitted to the outside of the audio equipment.

As shown in FIG. 1, optionally, the facing direction of the second audio inlet 20 is different from the facing direction of the second audio outlet 21. The facing direction of the second audio inlet 20 may be vertical to the facing direction of the second audio outlet 21. The facing direction of the second audio inlet 20 may be opposite to the facing direction of the first audio inlet 10. The facing direction of the second audio outlet 21 may be opposite to the facing direction of the first audio outlet 11. The facing direction of the second audio inlet 20 may be shown as the arrow being coaxial with the central axial line of the second audio inlet 20, and the facing direction of the second audio inlet 20 may be the right direction parallel to x-axis. In other words, the opposite direction of the arrow being coaxial with the central axial line of the second audio inlet 20 in FIG. 1 is the face direction of the second audio inlet 20. The face direction of the second audio inlet 20 is opposite to the direction along which the audio signals of the second loudspeaker unit 4 are transmitted to the second air pipe 2. The facing direction of the second audio outlet 21 may be shown as the arrow being coaxial with the central axial line of the second audio outlet 21, and the facing direction of the second audio outlet 21 may be the lower direction parallel to y-axis. The facing direction of the second audio outlet 21 is the same as the direction along which the audio signals of the second air pipe 2 are transmitted to the outside of the audio equipment, and the facing direction of the second audio outlet 21 is opposite to the facing direction of the first audio outlet 11.

Figure 2:
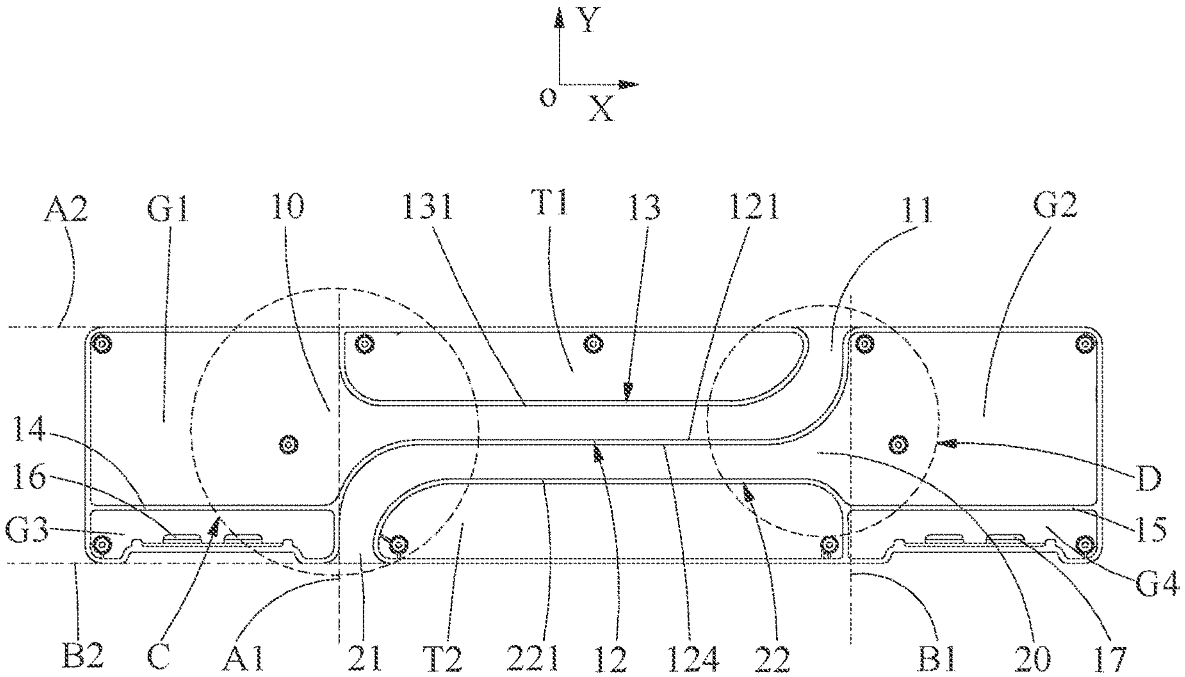
FIG. 2 is a front view diagram of an audio equipment according to one embodiment of the present disclosure (omitting a front case, a first loudspeaker unit and a second loudspeaker unit).

As shown in FIG. 2, optionally, the first audio inlet 10 includes the first audio input boundary A1, and first audio outlet 11 includes the first audio output boundary A2. The interface of the first cavity G1 and the first air pipe 1 (the first air pipe 1 may refer to FIG. 1, similarly hereinafter) is the first audio input boundary A1. The first audio input boundary A1 may be the left end surface of the first air pipe 1. The interface of the outside of the audio equipment and the first air pipe 1 is the first audio output boundary A2. The first audio output boundary A2 may be the upper end surface of the first air pipe 1, and in other words, the first audio output boundary A2 may be the outer plane on the upper side wall of the audio equipment. The first cavity G1 and the first air pipe 1 are connected, and the opening of the first cavity G1 and the first audio inlet 10 of the first air pipe 1 are jointed.

Figure 3:
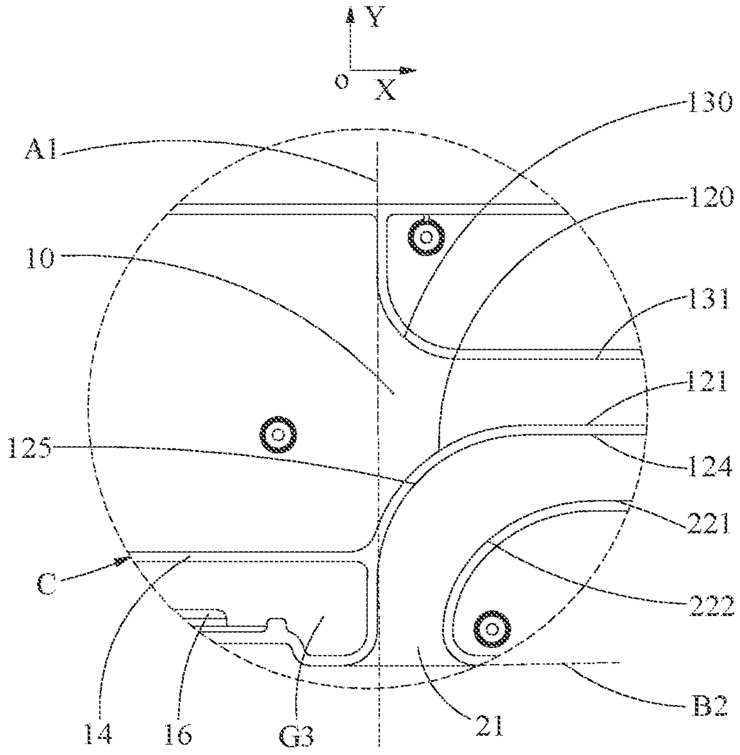
FIG. 3 is an enlarged diagram of a C portion in FIG. 2 according to one embodiment of the present disclosure.
Figure 4:
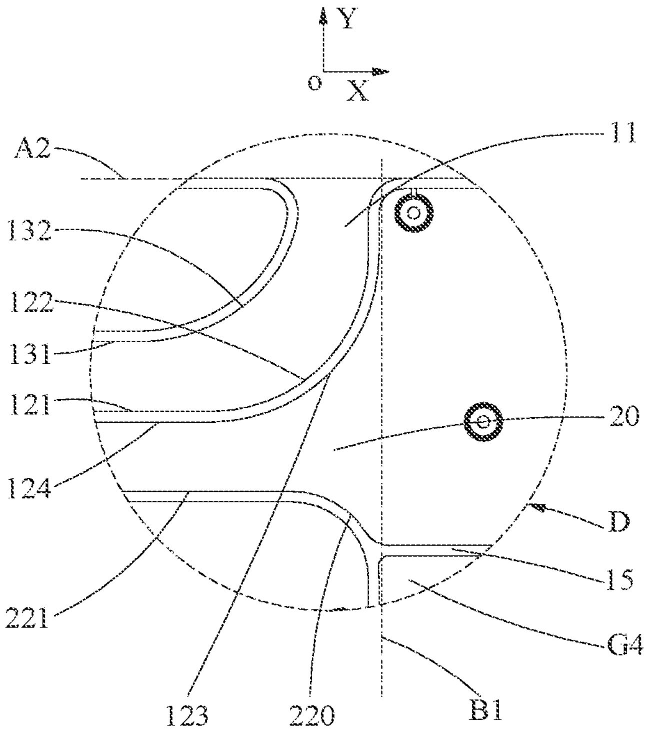
FIG. 4 is an enlarged diagram of a D portion in FIG. 2 according to one embodiment of the present disclosure.

Referring to FIGS. 3 and 4, optionally, the first wall 12 (the first wall 12 may refer to FIG. 1) includes the first arc surface 120, the first plane 121 and the second arc surface 122, and the first arc surface 120 extends from the first audio input boundary A1 to the first plane 121. The second arc surface 122 extends from the first plane 121 to the first audio output boundary A2. The first arc surface 120 may protrude toward the first loudspeaker unit 3 (the first loudspeaker unit 3 may refer to FIG. 1). The left end of the first arc surface 120 may be tangential to the first audio input boundary A1. The right end of the first arc surface 120 may be tangential to the left end of the first plane 121. The first plane 121 may be parallel to XOZ plane. The first arc surface 120 and the second arc surface 122 may be circular arc surfaces.

Referring to FIGS. 3 and 4, the second arc surface 122 may protrude toward the second loudspeaker unit 4 (the second loudspeaker unit 4 may refer to FIG. 1). The left end of the second arc surface 122 may be tangential to the right end of the first plane 121. The upper end of the second arc surface 122 may be tangential to the first audio output boundary A2. A second cavity G2 and the second air pipe 2 are connected, and the opening of the second cavity G2 and the second audio inlet 20 of the second air pipe 2 are jointed. In contrast to that the first audio inlet 10 or the first audio outlet 11 is at right angles, the first wall 12 (the first wall 12 may refer to FIG. 1, similarly hereinafter) with the first arc surface 120 and the second arc surface 122 may cause the audio signals generated by the first loudspeaker unit 3 (the first loudspeaker unit 3 may refer to FIG. 1) to transmit more fluently on the first arc surface 120 and the second arc surface 122, and it is not easy to generate turbulences and noises when the audio signals generated by the first loudspeaker unit 3 pass through the first air pipe 1 (the first air pipe 1 may refer to FIG. 1). In contrast to that, the first arc surface 120 and the second arc surface 122 adopt curved surfaces protruding upward for connection, the first plane 121 disposed between the first arc surface 120 and the second arc surface 122 may reduce the distance between the highest point on the surface of the first wall 12 and the second audio output boundary B2, thereby meeting the requirements of the audio equipment with narrow adaption.

Referring to FIGS. 3 and 4, the first air pipe 1 further includes a second wall 13. The second wall 13 extends from the first audio inlet 10 to the first audio outlet 11, and the second wall 13 faces the first wall 12. The second wall 13 may be vertical to the inner wall of the back case 5 and be fixed on the inner wall of the back case 5. For example, the second wall 13 and the back case 5 may be integrally formed. The length of the second wall 13 may be less than the length of the first wall 12. The second wall 13 may be located above the first wall 12. The trend of the second wall 13 may be in a shape of "U". The shape of the cross section of the second wall 13 may be a rectangle.

Referring to FIGS. 3 and 4, the second wall 13 (the second wall 13 may refer to FIG. 2, similarly hereinafter) extends from the first audio inlet 10 to the first audio outlet 11. In one embodiment, the third arc surface 130 of the second wall 13 extends to the first audio input boundary A1, and the fourth arc surface 132 of the second wall 13 extends to the first audio output boundary A2. In another embodiment, the lower surface of the second wall 13 extends from an arbitrary position on the upper surface of the first audio inlet 10 to an arbitrary position on the left side surface of the first audio outlet 11.

As shown in FIG. 1, optionally, the audio equipment further includes a first accommodation cavity T1, and the first accommodation cavity T1 includes the second wall 13. The lower side wall of the first accommodation cavity T1 may be the second wall 13. The front case 6 (the front case 6 may refer to FIG. 5), the back case 5, the upper side wall of the second wall 13 may form the first accommodation cavity T1. The first accommodation cavity T1 may accommodate a circuit board used in the audio equipment. The second wall 13 is disposed around the first accommodation cavity T1. The first accommodation cavity T1 includes the second wall 13 of the first air pipe 1, and in other words, the first accommodation cavity T1 and the first air pipe 1 at least shares the second wall 13. Hence, the space occupied by the second wall 13 on the first air pipe 1 or the first accommodation cavity T1 is at least saved and thus the space inside the audio equipment occupied by the first air pipe 1 or the first accommodation cavity T1 is reduced.

Referring to FIGS. 3 and 4, optionally, the second wall 13 (the second wall 13 may refer to FIG. 1) includes the third arc surface 130, the second plane 131 and the fourth arc surface 132, and the third arc surface 130 extends from the first audio input boundary A1 to the second plane 131. The fourth arc surface 132 extends from the second plane 131 to the first audio output boundary A2. The fourth arc surface 132 and the second arc surface 122 may be disposed in parallel with each other. The third arc surface 130 may protrude toward the first loudspeaker unit 3 (the first loudspeaker unit 3 may refer to FIG. 1). The left end of the third arc surface 130 may be tangential to the first audio input boundary A1. The right end of the third arc surface 130 may be tangential to the left end of the second plane 131. The second plane 131 may be parallel to XOZ plane. The third arc surface 130 and the fourth arc surface 132 may be circular arc surfaces.

Referring to FIGS. 3 and 4, the fourth arc surface 132 may protrude toward the second loudspeaker unit 4 (the second loudspeaker unit 4 may refer to FIG. 1). The left end of the fourth arc surface 132 may be tangential to the right end of the second plane 131. The upper end of the fourth arc surface 132 may be tangential to the first audio output boundary A2. In contrast to that the first audio inlet 10 or the first audio outlet 11 is at right angles, the second wall 13 (the second wall 13 may refer to FIG. 1) with the third arc surface 130 and the fourth arc surface 132 may cause the audio signals generated by the first loudspeaker unit 3 (the first loudspeaker unit 3 may refer to FIG. 1) to transmit more fluently on the third arc surface 130 and the fourth arc surface 132, and it is not easy to generate turbulences and noises when the audio signals generated by the first loudspeaker unit 3 pass through the first air pipe 1 (the first air pipe 1 may refer to FIG. 1).

Referring to FIGS. 3 and 4, in contrast to that, the third arc surface 130 and the fourth arc surface 132 adopt curved surfaces protruding downward for connection, the second plane 131 disposed between the third arc surface 130 and the fourth arc surface 132 may reduce the width of the second wall 13 (the second wall 13 may refer to FIG. 1), thereby meeting the requirements of the audio equipment with narrow adaption. The width of the second wall 13 is the distance between the lowest point on the lower surface of the second wall 13 and the first audio output boundary A2. The first wall 12 (the first wall 12 may refer to FIG. 1) includes the first plane 121, and the second plane 131 is disposed in parallel with the first plane 121.

Referring to FIGS. 1 and 2, optionally, the second audio inlet 20 includes the second audio input boundary B1, and the second audio outlet 21 includes the second audio output boundary B2. The interface of the second cavity G2 and the second air pipe 2 is the second audio input boundary B1. The second audio input boundary B1 may be the right end surface of the second air pipe 2. The interface of the outside of the audio equipment and the second air pipe 2 is the second audio output boundary B2. The second audio output boundary B2 may be the lower end surface of the second air pipe 2, and in other words, the second audio output boundary B2 may be the outer surface of the lower side wall of the audio equipment.

Referring to FIGS. 3 and 4, the first wall 12 (the first wall 12 may refer to FIG. 1) further includes the fifth arc surface 123, the third plane 124 and the sixth arc surface 125, and the fifth arc surface 123 extends from the second audio input boundary B1 to the third plane 124. The sixth arc surface 125 extends from the third plane 124 to the second audio output boundary B2. The fifth arc surface 123 may be disposed in parallel with the second arc surface 122. The sixth arc surface 125 may be disposed in parallel with the first arc surface 120. The fifth arc surface 123 may protrude toward the second loudspeaker unit 4 (the second loudspeaker unit 4 may refer to FIG. 1). The right end of the fifth arc surface 123 may be tangential to the second audio input boundary B1. The left end of the fifth arc surface 123 may be tangential to the right end of the third plane 124. The third plane 124 may be parallel to XOZ plane. The fifth arc surface 123 and the sixth arc surface 125 may be circular arc surfaces.

Referring to FIGS. 3 and 4, the sixth arc surface 125 may protrude toward the first loudspeaker unit 3 (the first loudspeaker unit 3 may refer to FIG. 1). The right end of the sixth arc surface 125 may be tangential to the left end of the third plane 124. The lower end of the sixth arc surface 125 may be tangential to the second audio output boundary B2. In contrast to that the second audio inlet 20 or the second audio outlet 21 is at right angles, the first wall 12 (the first wall 12 may refer to FIG. 1) with the fifth arc surface 123 and the sixth arc surface 125 may cause the audio signals generated by the second loudspeaker unit 4 (the second loudspeaker unit 4 may refer to FIG. 1) to transmit more fluently on the fifth arc surface 123 and the sixth arc surface 125, and it is not easy to generate turbulences and noises when the audio signals generated by the second loudspeaker unit 4 pass through the second air pipe 2 (the second air pipe 2 may refer to FIG. 1). In contrast to that the fifth arc surface 123 and the sixth arc surface 125 adopt curved surfaces protruding downward for connection, the third plane 124 disposed between the fifth arc surface 123 and the sixth arc surface 125 may reduce the distance between the lowest point on the lower surface of the first wall 12 and the first audio output boundary A2, thereby meeting the requirements of the audio equipment with narrow adaption.

As shown in FIG. 1 1, optionally, the second air pipe 2 further includes a third wall 22, and the third wall 22 extends from the second audio inlet 20 to the second audio outlet 21 and faces the first wall 12. The third wall 22 may be vertical to the inner wall of the back case 5 and be fixed on the inner wall of the back case 5. For example, the third wall 22 and the back case 5 may be integrally formed. The length of the third wall 22 may be less than the length of the first wall 12. The third wall 22 may be located below the first wall 12. The trend of the third wall 22 may be in a shape of inverted "U". The shape of the cross section of the third wall 22 may be a rectangle.

Referring to FIGS. 3 and 4, the third wall 22 (the third wall 22 may refer to FIG. 1, similarly hereinafter) extends from second audio inlet 20 to the second audio outlet 21. In one embodiment, the seventh arc surface 220 of the third wall 22 extends to the second audio input boundary B1, and the eighth arc surface 222 of the third wall 22 extends to the second audio output boundary B2. In another embodiment, the upper side surface of the third wall 22 extends from an arbitrary position on the lower side surface of the second audio inlet 20 to an arbitrary position on the right side surface of the second audio outlet 21.

As shown in FIG. 1 1, optionally, the audio equipment further includes a second accommodation cavity T2, and the second accommodation cavity T2 includes the third wall 22. The upper side wall of the second accommodation cavity T2 may be the third wall 22. The second accommodation cavity T2 may be disposed under the first accommodation cavity T1, and the first wall 12 may be located between the first accommodation cavity T1 and the second accommodation cavity T2. The front case 6 (the front case 6 may refer to FIG. 5), the back case 5, the lower side wall of the audio equipment and the third wall 22 form the second accommodation cavity T2. The second accommodation cavity T2 may accommodate a circuit board used in the audio equipment. The third wall 22 is disposed around the second accommodation cavity T2. The second accommodation cavity T2 includes the third wall 22 of the second air pipe 2, and in other words, the second accommodation cavity T2 and the second air pipe 2 at least shares the third wall 22. Hence, the space occupied by the third wall 22 on the second air pipe 2 or the second accommodation cavity T2 is at least saved and thus the space inside the audio equipment occupied by the second air pipe 2 or the second accommodation cavity T2 is reduced. In one embodiment, the shape and the size of the first accommodation cavity T1 is equal to the shape and the size of the second accommodation cavity T2, and the first accommodation cavity T1 and the second accommodation cavity T2 are symmetrical to each other about the central axis of the audio equipment along x-axis.

Referring to FIGS. 3 and 4, optionally, the third wall 22 (the third wall 22 may refer to FIG. 1) includes the seventh arc surface 220, the fourth plane 221 and the eighth arc surface 222, and the seventh arc surface 220 extends from the second audio input boundary B1 to the fourth plane 221. The eighth arc surface 222 extends from the fourth plane 221 to the second audio output boundary B2. The eighth arc surface 222 may be disposed in parallel with the sixth arc surface 125. The seventh arc surface 220 may protrude toward the second loudspeaker unit 4 (the second loudspeaker unit 4 may refer to FIG. 1). The right end of the seventh arc surface 220 may be tangential to the second audio input boundary B1. The left end of the seventh arc surface 220 may be tangential to the right end of the fourth plane 221. The fourth plane 221 may be parallel to XOZ plane. The seventh arc surface 220 and the eighth arc surface 222 may be circular arc surfaces.

Referring to FIGS. 3 and 4, the eighth arc surface 222 may protrude toward the first loudspeaker unit 3 (the first loudspeaker unit 3 may refer to FIG. 1). The right end of the eighth arc surface 222 may be tangential to the left end of the fourth plane 221. The lower end of the eighth arc surface 222 may be tangential to the second audio output boundary B2. In contrast to that the second audio inlet 20 or the second audio outlet 21 is at right angles, the third wall 22 (the third wall 22 may refer to FIG. 1) with the seventh arc surface 220 and the eighth arc surface 222 may cause the audio signals generated by the second loudspeaker unit 4 (the second loudspeaker unit 4 may refer to FIG. 1) to transmit more fluently on the seventh arc surface 220 and the eighth arc surface 222, and it is not easy to generate turbulences and noises when the audio signals generated by the second loudspeaker unit 4 pass through the second air pipe 2 (the second air pipe 2 may refer to FIG. 1).

Referring to FIGS. 3 and 4, in contrast to that, the seventh arc surface 220 and the eighth arc surface 222 adopt curved surfaces protruding upward for connection, the fourth plane 221 disposed between the seventh arc surface 220 and the eighth arc surface 222 may reduce the width of the third wall 22 (the third wall 22 may refer to FIG. 1), thereby meeting the requirements of the audio equipment with narrow adaption. The width of the third wall 22 is the distance between the highest point on the upper surface of the third wall 22 and the second audio output boundary B2. The first plane 121, the second plane 131, the third plane 124 and the fourth plane 221 are disposed in parallel with each other. The first wall 12 (the first wall 12 may refer to FIG. 1) includes the third plane 124, and the fourth plane 221 is disposed in parallel with the third plane 124.

As shown in FIG. 1 and FIG. 2, the audio equipment further includes a third cavity G3 located on one side of the first cavity G1, and the third cavity G3 and the first cavity G1 shares the fourth wall 14. A fourth cavity G4 is located one side of the second cavity G2, and the fourth cavity G4 and the second cavity G2 shares a fifth wall 15. Two third loudspeaker units 16 are disposed on the third cavity G3, and the diaphragms of the two third loudspeaker units 16 faces downward and are exposed at the lower end surface of the case of the audio equipment, and the vibration directions of the diaphragms of the two third loudspeaker units 16 are parallel to y-axis. Two fourth loudspeaker units 17 are disposed on the fourth cavity G4, and the diaphragms of the two fourth loudspeaker units 17 faces upward and are exposed at the upper end surface of the case of the audio equipment, and the vibration directions of the diaphragms of the two fourth loudspeaker units 17 are parallel to y-axis. The vibration directions of the diaphragms of the two third loudspeaker units 16 are vertical to the vibration direction of diaphragm of the first loudspeaker unit 3, and the vibration directions of the diaphragms of the two fourth loudspeaker units 17 are vertical to the vibration direction of diaphragm of the second loudspeaker unit 4. In one embodiment, the first loudspeaker unit 3 and the second loudspeaker unit 4 are woofers, and the third loudspeaker units 16 and the fourth loudspeaker units 17 are tweeters.

Figure 5:
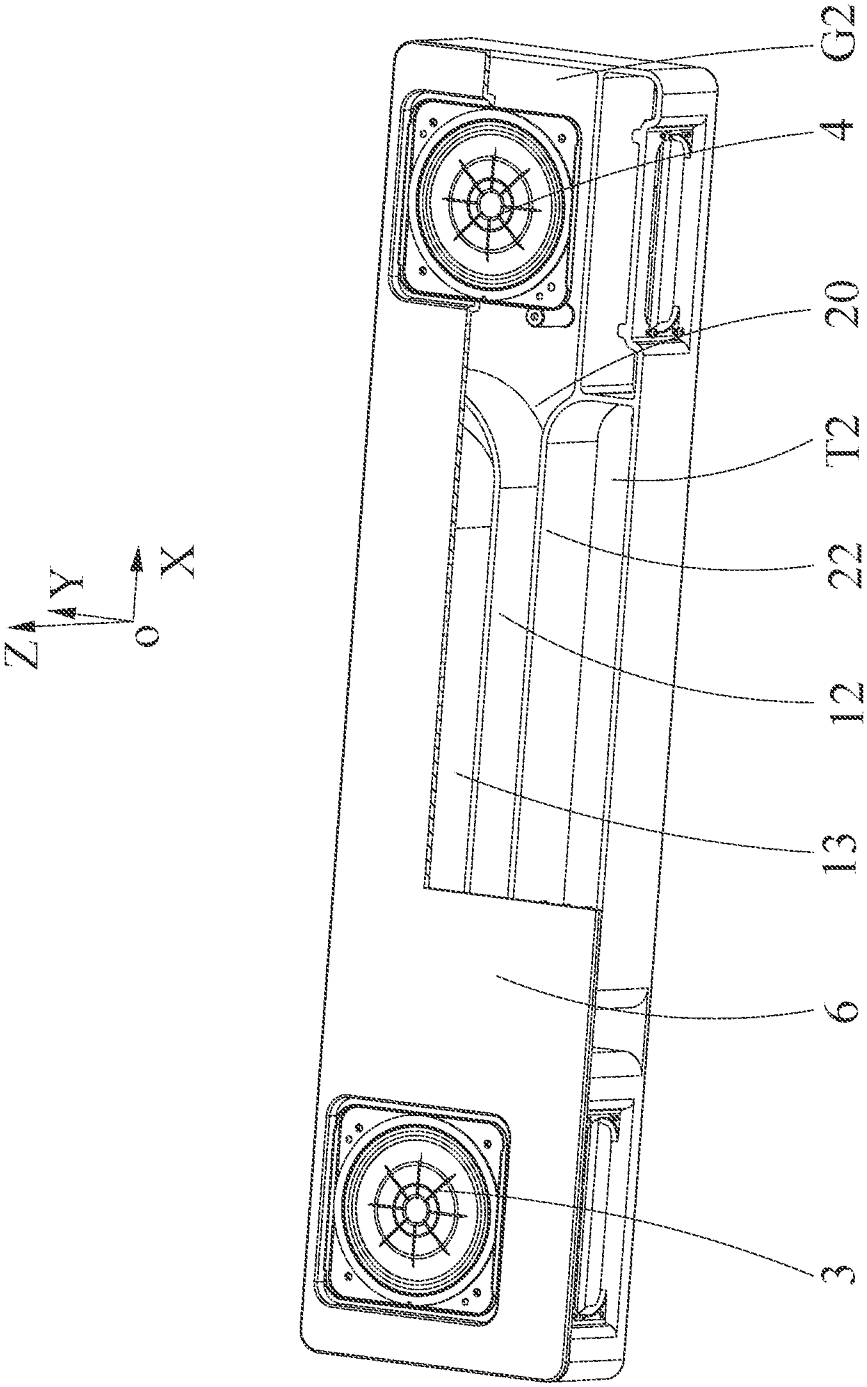
FIG. 5 is a 3D diagram of an audio equipment according to one embodiment of the present disclosure (partially sectioning a front case).

Referring to FIGS. 1 and 5, optionally, the audio equipment further includes the front case 6, the back case 5, the second wall 13 and the third wall 22, and the front case 6, the first wall 12, the second wall 13 and the back case 5 form the first air pipe 1. The front case 6, the first wall 12, the third wall 22 and the back case 5 form the second air pipe 2. The first air pipe 1 is encircled by the front case 6, the first wall 12, the second wall 13 and the back case 5, and it is convenient for the first wall 12 of the first air pipe 1 to manufacture. For example, when the trend of the first wall 12 of the first air pipe 1 is in a shape of "S" and the first air pipe 1 and the first wall 12 are formed by integral molding, forming the first wall 12 is difficult no matter how directions the first wall 12 is molded out.

Referring to FIGS. 1 and 5, when the first air pipe 1 is formed by covering the first wall 12 with the front case 6, the first wall 12 is formed by molding and the first wall 12 is covered by the front case 6 and the front case 6 is disposed on the first wall 12. Because the upper side and the lower side of the first wall 12 remain the space, the mold for manufacturing the first wall 12 may be removed along the direction parallel to z-axis so that the manufacturing of the first wall 12 by molding is more convenient. Similarly, because the second air pipe 2 includes the first wall 12, the second air pipe 2 is encircled by the front case 6, the first wall 12, the third wall 22 and the back case 5, and it is convenient for the second air pipe 2 to manufacture. The front case 6 may be fixed on the back case 5 by dismountable connection such as screw connection and engaging. The height of the first wall 12, the height of the second wall 13 and the height of the third wall 22 may be equal.

Referring to FIGS. 1 and 5, the audio equipment further includes the first cavity G1, the first loudspeaker unit 3, the second cavity G2 and the second loudspeaker unit 4, and the rear part of the first loudspeaker unit 3 is disposed on the first cavity G1, and the first air pipe 1 is connected to the first cavity G1 and the outside of the audio equipment. The rear part of the second loudspeaker unit 4 is disposed on the second cavity G2, and the second air pipe 2 is connected to the second cavity G2 and the outside of the audio equipment. The diaphragm of the front part of the first loudspeaker unit 3 and the diaphragm of the front part of the second loudspeaker unit 4 are directly exposed at through holes of the left side and the right side of the front case 6, and the rear part of the first loudspeaker unit 3 and the rear part of the second loudspeaker unit 4 face the back case 5. In other words, the first loudspeaker unit 3 and the second loudspeaker unit 4 transmit the audio signals to the outside of the through holes of the left side and the right side of the front case 6. In one embodiment, speaker mesh sheets cover above the diaphragm of the first loudspeaker unit 3 and the diaphragm of the second loudspeaker unit 4, and the speaker mesh sheets are locked on the front case 6 or are integrally formed with the front case 6. In another embodiment, the first loudspeaker unit 3 and the second loudspeaker unit 4 may be fixed on the front case 6 by dismountable connection, and there are gaps between the rear part of the first loudspeaker unit 3 and the back case 5 and between the rear part of the second loudspeaker unit 4 and the back case 5. In other words, the rear part of the first loudspeaker unit 3 and the rear part of the second loudspeaker unit 4 do not contact the back case 5. For example, the through holes are disposed on the left side and the right side of the front case 6. The rear part of the first loudspeaker unit 3 may pass through the through hole of the left side of the front case 6 and is embedded in the first cavity G1, and the front part of the first loudspeaker unit 3 may be exposed outside, and the first loudspeaker unit 3 is surrounded by the first cavity G1.

Referring to FIGS. 1 and 5, the rear part of the second loudspeaker unit 4 may pass through the through hole of the right side of the front case 6 and is embedded in the second cavity G2, and the front part of the second loudspeaker unit 4 may be exposed outside, and the second loudspeaker unit 4 is surrounded by the second cavity G2. The first loudspeaker unit 3 and the second loudspeaker unit 4 may be fixed on the front case 6 by dismountable connection such as screw connection and engaging. The first cavity G1 and the second cavity G2 may be respectively disposed on the left side and the right side of the audio equipment. The rear part of the first loudspeaker unit 3 may be located on the first cavity G1, and the first audio inlet 10 of the first air pipe 1 may be connected to the right end of the first cavity G1. The rear part of the second loudspeaker unit 4 may be located on the second cavity G2, and the second audio inlet 20 of the second air pipe 2 may be connected to the left end of the second cavity G2.

The audio equipment provided by the embodiments of the present disclosure is described in detail by the above description. A person of ordinary skill in the art would have changes in specific implementation and application scope according to the idea of the embodiments of the present disclosure. In view of the above description, the content of the present disclosure should not be construed as limitations of the present disclosure, and equivalent modification or changes according to the idea and the spirit of the present disclosure should be construed as being included within the claims of the present disclosure.

LIST OF REFERENCE SIGNS

- 1: first air pipe
- 10: first audio inlet
- 11: first audio outlet
- 12: first wall
- 120: first arc surface
- 121: first plane
- 122: second arc surface
- 123: fifth arc surface
- 124: third plane
- 125: sixth arc surface
- 13: second wall
- 130: third arc surface
- 131: second plane
- 132: fourth arc surface
- 14: fourth wall
- 15: fifth wall
- 16: third loudspeaker unit
- 17: fourth loudspeaker unit
- 2: second air pipe
- 20: second audio inlet
- 21: second audio outlet
- 22: third wall
- 220: seventh arc surface
- 221: fourth plane
- 222: eighth arc surface
- 3: first loudspeaker unit
- 4: second loudspeaker unit
- 5: back case
- 6: front case
- A1: first audio input boundary A2: first audio output boundary
B1: second audio input boundary
B2: second audio output boundary
G1: first cavity
G2: second cavity
G3: third cavity
G4: fourth cavity
T1: first accommodation cavity
T2: second accommodation cavity
W1: the width of the first audio inlet
W2: the width of the first audio outlet
W3: the width of the second audio inlet
W4: the width of the second audio outlet

The invention claimed is:

1. An audio equipment comprising:
a first air pipe comprising:
a first audio inlet;
a first audio outlet; and
a first wall extending from the first audio inlet to the first audio outlet; and
a second air pipe sharing the first wall with the first air pipe, and the second air pipe comprising:
a second audio inlet; and
a second audio outlet,
wherein the first wall extends from the second audio inlet to the second audio outlet, and wherein a facing direction of the first audio outlet is different from a facing direction of the second audio outlet,
wherein the first audio inlet is closer to the second audio outlet than the second audio inlet, and
wherein the first audio outlet is closer to the second audio inlet than the second audio outlet.

2. The audio equipment according to claim 1, wherein a facing direction of the first audio inlet is different from the facing direction of the first audio outlet.

3. The audio equipment according to claim 1, wherein a facing direction of the second audio inlet is different from the facing direction of the second audio outlet.

4. The audio equipment according to claim 1, wherein the first audio inlet comprises a first audio input boundary, and
wherein the first audio outlet comprises a first audio output boundary.

5. The audio equipment according to claim 4, wherein the first wall comprises:
a first arc surface;
a second arc surface; and
a first plane,
wherein the first arc surface extends from the first audio input boundary to the first plane, and the second arc surface extends from the first plane to the first audio output boundary.

6. The audio equipment according to claim 4, wherein the first air pipe further comprises a second extending from the first audio inlet to the first audio outlet and facing the first wall.

7. The audio equipment according to claim 6, further comprising a first accommodation cavity,
wherein the second wall is disposed around the first accommodation cavity.

8. The audio equipment according to claim 7, wherein the second wall comprises:
a third arc surface;
a fourth arc surface; and
a second plane,
wherein the third arc surface extends from the first audio input boundary to the second plane, and
wherein the fourth arc surface extends from the second plane to the first audio output boundary.

9. The audio equipment according to claim 8, wherein the first wall comprises a first plane, and the second plane is disposed in parallel with the first plane.

10. An audio equipment comprising:
a first air pipe comprising:
a first audio inlet;
a first audio outlet; and
a first wall extending from the first audio inlet to the first audio outlet; and
a second air pipe sharing the first wall with the first air pipe, and the second air pipe comprising:
a second audio inlet; and
a second audio outlet,
wherein the first wall extends from the second audio inlet to the second audio outlet, and wherein a facing direction of the first audio outlet is different from a facing direction of the second audio outlet,
wherein the second audio inlet comprises a second audio input boundary, and
wherein the second audio outlet comprises a second audio output boundary.

11. The audio equipment according to claim 10, wherein the first wall further comprises:
a fifth arc surface;
a sixth arc surface; and
a third plane,
wherein the fifth arc surface extends from the second audio input boundary to the third plane, and
wherein the sixth arc surface extends from the third plane to the second audio output boundary.

12. The audio equipment according to claim 10, wherein the second air pipe further comprises a third extending from the second audio inlet to the second audio outlet and facing the first wall.

13. The audio equipment according to claim 12, further comprising a second accommodation cavity, and
wherein the third wall is disposed around the second accommodation cavity.

14. The audio equipment according to claim 12, wherein the third wall comprises:
a seventh arc surface;
an eighth arc surface; and
a fourth plane,
wherein the seventh arc surface extends from the second audio input boundary to the fourth plane, and
wherein the eighth arc surface extends from the fourth plane to the second audio output boundary.

15. The audio equipment according to claim 14, wherein the first wall comprises a third plane, and
wherein the fourth plane is disposed in parallel with the third plane.

16. An audio equipment comprising:
a first air pipe comprising:
a first audio inlet;
a first audio outlet; and
a first wall extending from the first audio inlet to the first audio outlet; and
a second air pipe sharing the first wall with the first air pipe, and the second air pipe comprising:
a second audio inlet; and
a second audio outlet,
wherein the first wall extends from the second audio inlet to the second audio outlet, and wherein a facing direction of the first audio outlet is different from a facing direction of the second audio outlet, wherein the audio equipment further comprises:
a front case;
a back case;
a second wall; and
a third wall,
wherein the front case, the first wall, the second wall and the back case form the first air pipe, and
wherein the front case, the first wall, the third wall and the back case form the second air pipe.

17. An audio equipment comprising:
a first air pipe comprising:
a first audio inlet;
a first audio outlet; and
a first wall extending from the first audio inlet to the first audio outlet; and
a second air pipe sharing the first wall with the first air pipe, and the second air pipe comprising:
a second audio inlet; and
a second audio outlet;
a first cavity;
a second cavity;
a first loudspeaker unit; and
a second loudspeaker unit,
wherein the first loudspeaker unit is disposed on the first cavity,
wherein the first air pipe is connected to the first cavity and the outside of the audio equipment,
wherein the second loudspeaker unit is disposed on the second cavity,
wherein the second air pipe is connected to the second cavity and the outside of the audio equipment,
wherein the first wall extends from the second audio inlet to the second audio outlet, and
wherein a facing direction of the first audio outlet is different from a facing direction of the second audio outlet.

18. The audio equipment according to claim 17, wherein the first loudspeaker unit comprises diaphragm having a facing direction that is vertical to a facing direction of the first audio inlet, and
wherein the second loudspeaker unit comprises a diaphragm having a facing direction that is vertical to a facing direction of the second audio inlet.

19. An audio equipment comprising:
a first air pipe comprising:
a first audio inlet;
a first audio outlet; and
a first wall extending from the first audio inlet to the first audio outlet; and
a second air pipe sharing the first wall with the first air pipe, and the second air pipe comprising:
a second audio inlet; and
a second audio outlet,
wherein the first wall extends from the second audio inlet to the second audio outlet, and wherein a facing direction of the first audio outlet is different from a facing direction of the second audio outlet,
wherein a width of the first audio inlet is greater than a width of the first audio outlet, and
wherein a width of the second audio inlet is greater than a width of the second audio outlet.

* * * * *